3,711,527
PROCESS FOR THE PRODUCTION OF
3,4-UNSATURATED NITRILES
Peter Kurtz, Leverkusen, Germany, assignor to Farbenfabriken Bayer Aktiengesellschaft, Leverkusen, Germany
No Drawing. Filed Feb. 5, 1970, Ser. No. 9,033
Claims priority, application Germany, Feb. 10, 1969,
P 19 06 493.8; Dec. 2, 1969, P 19 60 380.6,
P 19 60 381.7
Int. Cl. C07c *121/20, 121/48, 121/52*
U.S. Cl. 260—465.8
14 Claims

ABSTRACT OF THE DISCLOSURE

Process for the production of 3,4-unsaturated nitriles together with carboxylic acids by reaction of allyl esters with hydrocyanic acid in the presence of a catalyst based on copper-I-halide at a temperature from 20 to 200° C., the reaction being carried out either in the gaseous phase or liquid phase.

---

This invention relates to a process for the production of 3,4-ethylenically unsaturated nitriles by reacting esters of unsaturated alcohols with hydrogen cyanide in the presence of a catalyst based on cuprous halide.

Several processes for the production of 1-cyano alkenes are known. For example, the reaction of a halide, especially a chloride, of the allyl series, with an alkali metal cyanide frequently does not give the expected allyl cyanide [Bl. 3, 33, 55 (1905); Bl. Soc. Chim. Belg. 31, 183, (Footnote) (1922); 33, 331 (1924); Ber. 56, 1172 (1923); Liebigs Ann. 596, 96, 133 (1955); German Pat. No. 851,059].

If a halide (chloride) of the allyl series is reacted with copper cyanide, the corresponding allyl cyanide is obtained in the form of a complex compound with cuprous chloride. Considerable difficulties are encountered in isolating the nitrile from the complex. In addition, the process involves the use of molar amounts of expensive cuprous cyanide [Bl. Soc. Chim. Belg. 31, 176 (1922); U.S. Pat. No. 2,448,755]. It is more advantageous to react a halide (chloride) of the allyl series with hydrocyanic acid in aqueous medium in the presence of a catalytic amount of a cuprous salt at pH value in the range from 3.0 to 4.5.

The process is not accompanied by rearrangement of the double bond, and enables the reaction product to be worked up easily. Unfortunately, preparation of the starting materials involves the use of chlorine, whilst sodium hydroxide had to be used in the reaction, so that a solution of sodium chloride is formed as secondary reaction product. In addition, there are losses of material through hydrolysis of the chloride into 2,3-unsaturated alcohol [Liebigs Ann. 631, 21–56 (1960); especially pp. 22, 23, 27; German Pats. 872,941 and 878,942].

Another known process is based on the reaction of an alcohol from the allyl series with a molar amount of expensive cuprous cyanide in the presence of a molar amount of hydrochloric acid [Bl. Soc. Chim. Belg. 39, 466,468 (1930); ibid 42, 427, 429 (1933)].

The preparation of allyl cyanide by reacting allyl formate with a molar amount of cuprous cyanide in the presence of a molar amount of hydrochloric acid has also been described [Bl. Soc. Chim. Belg. 39, 465, 468 (1930)].

It is also known that allyl cyanide can be prepared by reacting an alcohol from the allyl series with hydrocyanic acid in the presence of a catalyst solution containing cuprous chloride. Unfortunately, considerable difficulties were encountered in the practical application of this process, because the formation of water alters the composition of the catalyst, in addition to which the nitriles difficult to isolate [Liebigs Ann. 631, 21 (1960)].

It is an object of this invention to provide a particularly simple process for the production of 3,4-ethylk cally unsaturated nitriles, in addition to carboxylic ac which avoids the disadvantages mentioned above. 1 object is accomplished by a process which comprises acting an ester corresponding to the formula

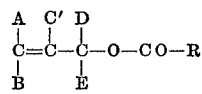

wherein the radicals A, B, C', D and E, which may the same or different, each represent hydrogen or a lo alkyl radical, and one of the aforementioned radi( may also represent a phenyl or cyclohexyl radical, opti ally substituted by lower alkyl radicals, or the rad —CH₂—O—CO—R, R represents hydrogen or a lo aliphatic radical, with hydrogen cyanide in the prese of a catalyst based on cuprous halide at a temperature the range from about 20 to about 200° C.

In the present context, lower alkyl radicals (A to include those with preferably up to 6 carbon atoms. C( pounds in which R represents hydrogen or an aliph: radical with 1 to 4 carbon atoms, i.e. esters of lower ( boxylic acids, such as formic acid, acetic acid, propic acid or butyric acid, are preferably used for carrying the process according to the invention. Naturally, the pi ess according to the invention is not limited in its pract application to the aforementioned acids, so that in sc instances it is possible to use aromatic carboxylic ac The following alcohols are preferably employed for preparation of the esters used as starting materials: ɪ pene-(1)-ol-(3); 2-methyl - propene-(1)-ol-(3); 2-etl propene-(1)-ol-(3); butene - (2)-ol-(1); butene-(1) (3); pentene-(2)-ol-(1); pentene-(1)-ol-(3); 3-methyltene-(2)-ol-(1)); 3-methyl-butene-(1)-ol-(3); 2-metl butene-(2)-ol-(1); 2-methyl - butene-(1)-ol-(3); hexe (2)-ol-(1); hexene-(1)-ol-(3); 1-vinyl - cyclo - pentaɪ (1); cyclopentene-(1)-ol-(3); 1-vinyl-cyclohexanol-( cyclohexene-(1)-ol-(3); 3-hydroxy-(1)-phenyl - prope (1); 1-hydroxy-(1)-phenyl-propene-(2); butene-(2)-d (1,4); butene-(1)-diol-(3,4); 2-methyl - butene-(2)-d (1,4); 2,3-dimethyl - butene-(2)-diol-(1,4); hexene-( diol-(1,4); hexene-(3)-diol-(2,5); hexadiene-(2,4)-d diol-(1,6); and hexadiene-(1,5)-diol-(3,4).

The esters used are known and can be obtained known processes.

With the diesters of isomeric alcohols (for exam butene diols), it is also possible in some instances to mixtures thereof.

In the practical application of the process, it is prefeɪ to use commercial highly concentrated hydrocyanic ɑ (containing up to 10% by weight of water), althoug is of course also possible to use anhydrous hydro cyanide. The process according to the invention is carɪ out at a temperature in the range from about 20 to aʰ 200° C., and preferably at a temperature of from aʰ 60 to about 140° C., where it is conducted in the lic phase. When the process is carried out at elevated t peratures in the liquid phase, the reaction is conduᴄ under a pressure corresponding at most to the paɪ pressure of hydrogen cyanide. The process is illustrɑ with reference to the following example:

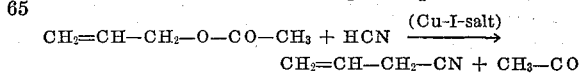

It is important, so far as the practical applicatioɪ the process is concerned, that an extremely high conᴄ tration of dissolved cuprous halide should be produ in the reaction mixture. This can be achieved by u tion promoters for the insoluble cuprous halide (preferably chloride or bromide). Suitable solution promoters of this kind include alkali metal and alkaline earth metal (preferably sodium, potassium, calcium, magnesium, or lithium) halides (preferably chlorides or bromides), ammonium chloride when water or an amide (preferably formamide or dimethyl formamide) [U.S. Pat. 2,227,478] is used as solvent. Nitriles are preferably used as solvents for carrying out the process, the nitriles formed during the reaction being the most suitable. Although, as already mentioned, water may also be used for carrying out the process, it is better to operate in an anhydrous medium because, in this way, hydrolysis of the ester used into the corresponding alcohol is avoided.

A preferred embodiment of the process, employs a catalyst containing at least a molar amount of cuprous halide in addition to a halide of an organic amine of the kind described in U.S. Pats. Nos. 1,926,056, 1,926,055; 1,926,039.

In some instances it may be of particular advantage to use as catalyst an anhydrous molten salt mixture of cuprous halide and one or several halides of ammonia or aromatic organic amine bases of the kind described in German Pat. No. 697,268. When a salt melt is used in the process according to the invention, it is preferred to employ one with a melting point of from about 30 to about 100° C.

Broadly, it can be said that the process according to the invention may be carried out with any known solid Nieuwland catalyst systems or corresponding modifications based on cuprous chloride of the kind described for example in the following patent specifications: U.S. Nos. 1,811,959; 1,926,039; 1,926,055; and 1,926,-

It is also possible to use some of the already very well known [cf. Ch. Rabaut, Bull. Soc. Chim. France 3, 19, (1898)] crystalline complex salts of nitriles and cuprous chloride as catalysts for the reaction of esters of unsaturated alcohols with hydrogen cyanide.

It is known that only a few nitriles form crystallised complex salts with cuprous chloride. In these complexes, there is an integral stoichiometric ratio between the nitrile groups and the cuprous chloride (for example CN:CuCl=2:1, 1:1, or 1:2). It has been found that only a few of these complexes show high catalytic activity. These complexes are as follows:

CH₂=CH—CH₂—CN·2CuCl

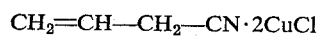

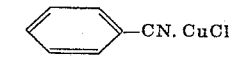

In some instances, the use of these nitrile/CuCl complexes as catalysts affords advantages over the use of the catalysts described above. For example, 3-cyano-1-propene (allyl cyanide) is quickly obtained in high yield by the reaction of allyl acetate with hydrogen cyanide in the presence as catalyst of the complex salt of allyl cyanide and cuprous chloride which, though mentioned in the literature [cf. R. Breckpot, Bull. Soc. Chim. Belg. 62, p. 466 (1930)] has not yet been described in respect of composition. The advantage of this catalyst is that, apart from the catalyst and the mixture of allyl acetate and hydrogen cyanide, no other chemicals are needed for the reaction. The catalyst left as residue when the reaction is over, and after the reaction products have been distilled off, retains its activity and may readily be used without further treatment for another batch. 1-acetoxymethyl)-3-cyano-1-propene

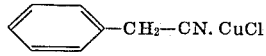

the reaction product of one ester group with 1 mol of hydrogen cyanide, is obtained by reacting 1,3-diacetoxy-2-methylene propane

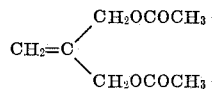

with hydrogen cyanide in the presence of a nitrile-CuCl complex as catalyst, whilst the main product when a melt of hydrochlorides of different amines and CuCl is used as catalyst as described above, is 3-methylene glutaric acid dinitrile

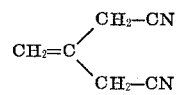

The nitrile-CuCl complexes are prepared in accordance with the procedure described by Ch. Rabaut, Bull. Soc. Chim. France 3, 19, 785 (1898) or by S. K. Smirnov, E. L. Gal'perin and O. G. Stukov in Russian Journal of Inorganic Chemistry 11, No. 3306 (1966).

Some complexes can also be prepared by dissolving CuCl in hot nitrile, optionally in the presence of a solvent such as glacial acetic acid. The complex crystallises out on cooling given a suitable ratio of CuCl to nitrile.

It can be obtained in pure form by filtration and drying.

It is also possible, and in many instances advantageous, to carry out the reaction in the gas phase in the presence of a catalyst based on cuprous halide applied to a supporting material.

Suitable supporting materials include any conventional catalyst supports, especially substances with a large surface such as pumice, porous clay, Al₂O₃, active carbon and, primarily, silica.

The temperatures at which the reaction is carried out must provide for both of the starting materials and the end products, i.e. the nitriles and the carboxylic acid, being in the gas phase. The most favourable range is from 120 to 200° C. If the products are not evaporated at these temperatures, their partial pressure can be reduced either by applying a vacuum (approximately 10 to 100 torr) or by diluting the reaction products with an inert gas. Suitable inert gases include nitrogen, helium, carbon monoxide or hydrogen cyanide. The reaction products can be isolated by known methods, for example by condensation, adsorption and washing with suitable solvents.

The end products are isolated in highly pure form by rectification or recrystallisation.

The catalysts used applied to supporting materials lose some of their activity over a period of time. This is attributable to the fact that small quantities of bound chlorine (halogen) escape with the reaction products.

The catalysts regain their original activity, however, when small quantities of chlorine compounds (for example alken-2-yl-chloride or hydrogen chloride) are added to the reaction products either continuously or at suitable intervals. It is of course also possible to carry out the process with a fluidised-bed catalyst.

The quantity in which the catalyst or catalyst mixture is used is such that at least 0.1% by weight of cuprous halide, based on the weight of the ester used, is available. In general, it has proved to be of advantage to begin the reaction with a molar quantity of catalyst (based on the cuprous halide content) and to re-use, for subsequent batches, the catalyst residue left on completion of the reaction.

In general, it is advisable to react the ester used with substantially the stoichiometrically necessary quantity of hydrogen cyanide. In some instances, however, it may be of advantage to operate with an excess of ester (around 2 to 3-fold) because, in this instance, the ester simultaneously acts as extractant for the nitrile formed and for the corresponding carboxylic acid.

The reaction mixtures are worked up in the usual way.

The process according to the invention is distinguished from the conventional processes for preparing unsaturated nitriles referred to earlier on inter alia by the fact that it employs, as starting materials, compounds which can be prepared particularly economically and are therefore inexpensive because no chlorine is required for their preparation.

The following examples are to furthr illustrate the invention without limiting it.

EXAMPLE 1

A catalyst solution is prepared as follows:

99 g. of cuprous chloride, 53 g. of ammonium chloride, 84 ml. of water, 1.5 ml. of concentrated hydrochloric acid and approximately 0.5 g. of copper powder (for completely reducing any cupric ions present) are heated at 80° C. in a nitrogen atmosphere. A clear colourless solution is formed. A mixture of 10 g. (1 mol) of allyl acetate and 27 g. (1 mol) of anhydrous hydrogen cyanide is added dropwise to this solution over a period of 1.5 hours, after which the reaction mixture is heated for another hour. The contents of the flask are then distilled in vacuo into a cold trap. The salts are left behind in the flask.

Titration and gas chromatography show that the contents of the trap (151 g.) constitute a mixture which, in addition to water, contains 47.2 g. of allyl cyanide and 42.4 g. of acetic acid, 80 ml. of water and 3 ml. of concentrated hydrochloric acid are added to the hydrochloric acid residue from the distillation in vacuo, followed by heating to 80° C. The test is repeated with this catalyst solution using the same quantities of starting products and under the same conditions.

On this occasion, 222 g. of a mixture of 67.2 g. of allyl cyanide and 58.0 g. of acetic acid (rest water) are obtained in the cold trap.

A third run produces, in the trap, 245 g. of a liquid which, in addition to water, contains 72.5 g. of allyl cyanide and 66.0 g. of acetic acid.

The yields from the three tests are as follows: allyl cyanide, B.P. 118.6° C.; 93% of the theoretical, based on the allyl acetate used, acetic acid, B.P. 118.5° C.; 92% of the theoretical, based on the allyl acetate used.

EXAMPLE 2

32 g. of cuprous chloride and 32 g. of trimethyl-amine hydrochloride are suspended in 100 g. of allyl acetate, and the mixture is heated to 80° C. under nitrogen. 37 g. of hydrocyanic acid are added dropwise over a period of 4 hours. The temperature falls to 70° C. through the hydrocyanic acid boiling under reflux. After refluxing for another 3 hours the contents of the flask are steam distilled. The organic upper layer of distillate is taken up in methylene chloride, separated from the aqueous layer and dehydrated to separate off the water/methylene chloride azeotrope. The solvent is distilled off up to a temperature of 95° C. A colourless liquid (67 g.) is left behind as residue in the flask, its composition being determined by gas chromatography as: 0.7% of allyl alcohol, 29.4% of allyl acetate, 68.5% of allyl cyanide, and 1% of acetic acid (not all the acetic acid was detected in this test). Accordingly, the yield of allyl cyanide is 69%, based on the allyl acetate used, and 88% based on the allyl acetate reacted.

EXAMPLE 3

The catalyst comprised a melt (M.P. above 30° C.) of 20 g. of trimethylamine hydrochloride, 20 g. of dimethylamine hydrochloride, 20 g. of ethanolamine hydrochloride and 50 g. of cuprous chloride. A mixture of 200 g. (2 mols) of allyl acetate and 27 g. (1 mol) of hydrogen cyanide was added dropwise over a period of 3 hours at 80° C., and the mixture was heated for another 4 hours on completion of the dropwise addition. After cooling, the reaction mixture separated into two layers. The up layer was decanted off and distilled in vacuo into a tr 45 g. of a dark oil were left as residue. The contents the trap, 161.5 g. had the following composition as termined by gas chromatography: 1.0% of hydrocya acid, 0.7% of water, 43.8% of unchanged allyl aceta 0.7% of allyl alcohol, 31.2% of allyl cyanide, and 22.6 of acetic acid. The yield of allyl cyanide was thus 75 whilst the yield of acetic acid was 61% of the theoretic based on the allyl acetate used.

EXAMPLE 4

A mixture of 100 g. (1 mol) of allyl acetate and 27 (1 mol) of hydrocyanic acid is added dropwise over period of 2 hours to a suspension, heated to 80° C. in nitrogen atmosphere, of 99 g. of cuprous chloride and 5 of ammonium chloride in 150 g. of dimethyl formami and the mixture is kept at that temperature for a period 4 hours. The upper clear layer of the reaction mixture decanted off and distilled in vacuo. The distillate wei 141 g., 56.5 g. of a dark salt being left as residue. 100 of dimethyl formamide are added to the lower layer a the test is repeated under the conditions described abc with a mixture of 100 g. of allyl acetate and 27 g. of 1 drogen cyanide.

The contents of the flask are then filtered off from salt under suction and the contents of the filter are wash with 90 g. of dimethyl formamide. The mother liqu is distilled in vacuo. Distillate 398 g. Residue 68 g. of s The distillates are combined and fractionated. The m runnings distill over at 30–130° C./750 torr, and we 156.4 g.

Composition as determined by gas chromatograph 17.6% of hydrocyanic acid, 1.1% of acetic acid, 15.3 of allyl cyanide, 57.3% of allyl acetate and 7.4% of methyl formamide. The residue from this distillati weighs 362 g. Composition as determined by gas chro atography: 12.4% of acetic acid, 8.7% of allyl cyani 2.1% of allyl acetate, and 76.4% of dimethyl formami The following yields can be calculated from th figures:

Allyl cyanide 56.2 g.=42%, based on the esters us and 81% based on the esters reacted; acetic acid 4 g.=39% and 75%, respectively. Allyl acetate recover 96.6 g.=48% of the quantity initially used, dimet formamide recovered 288.6 g.=85% of the quantity i tially used.

EXAMPLE 5

99 g. (1 mol) of cuprous chloride are added un nitrogen to 135 g. (2 mols) of allyl cyanide. The co plex compound of the allyl cyanide with cuprous chlor is formed in the presence of heat spontaneously generat being heated finally to a temperature of 80° C. A mixtu of 100 g. (1 mol) of allyl acetate and 27 g. (1 mol) hydrogen cyanide is added dropwise to the complex co pound over a period of 3 hours and the mixture is th heated for another 3 hours at 80° C. After cooling, upper clear layer is decanted off and distilled off in vacu The distillate, 149 g., contains 24.5% of acetic ac 77.2% of allyl cyanide and 2.0% of allyl acetate.

The quantity of complex compound left in the flasl diluted with 135 g. (2 mols) of allyl cyanide and the t is repeated.

After cooling, the reaction mixture is filtered off fr the salt under suction and the mother liquor is distil in vacuo.

The distillate, 346 g., contains 1.2% of hydrocya acid, 17.8% of acetic acid, 76.7% of allyl cyanide a 4.2% of allyl acetate.

The following yields are calculated from these figur

The acetic acid yield is 141 g. or 78.5%, based on esters used, whilst the yield of allyl cyanide is 381.0 Distillation of the 270 g. used leaves 111.0 g. or 83 based on the ester used. 17.6 g. of allyl acetate are red, corresponding to 8.7% of the quantity initially

EXAMPLE 6 mixture of 86 g. (1 mol) of allyl formate and 27 g. (1 mol) of hydrogen cyanide is added dropwise to the catalyst solution described in Example 1. The test conditions and working-up procedure are the same as described in Example 1. The test which was repeated twice more, gave the results set out in the following Table:

|  | Allyl formate | | Allyl cyanide | | Formic acid | |
|---|---|---|---|---|---|---|
|  | Grams | Percent | Grams | Percent | Grams | Percent |
| ---------- | 9.0 | 10 | 56.2 | 83 | 32.9 | 71 |
| ---------- | 11.3 | 13 | 48.4 | 91 | 41.9 | 91 |
| ---------- | 13.7 | 16 | 50.5 | 74 | 40.5 | 88 |
| Total | 34.0 | | 155.1 | | 115.3 | |
| Recovered | | 13 | | (¹) | | (²) |

¹ % based on quantity initially used. 87.5% based on the quantity reacted.
² % used; 96% reacted.

EXAMPLE 7 mixture of 128 g. (1 mol) of allyl butyrate and 27 g. hydrogen cyanide is added dropwise over a period of hours to a catalyst solution having the composition described in Example 1. The reaction time is 4 hours. The cyanide is steam distilled from the reaction mixture. upper layer is diluted with methylene chloride and ated off from the aqueous layer. The solvent is then led off and the quantities of unchanged allyl butyrate allyl cyanide formed, present in the residue are determined by gas chromatography.

e residue from the steam distillation is extracted with ylene chloride and the quantity of butyric acid in xtract determined by titration.

ing the catalyst solution from which the reaction acts have been removed, the test is repeated under ame conditions and the same quantities.

e following yields are obtained from this double test: g. of unchanged ester, 110.8 g. of allyl cyanide and g. of butyric acid.

cordingly, the yield of allyl cyanide is 83%, based on uantity of ester used, and 89% based on the quantity ter reacted. The yield of butyric acid is 86% and respectively. The use of a copper bromide catalyst to the same result.

EXAMPLE 8 tches of 20 g. of each of the hydrochlorides of triylamine, dimethylamine and ethanolamine are fused her in the presence of 50 g. of cuprous chloride.

mixture of 114 g. (1 mol) of methallyl acetate and (1 mol) of hydrogen cyanide is added dropwise over iod of 2 hours to the melt heated to 80° C. After ng for another 3 hours the contents of the flask are disin a falling-film evaporator, (evaporator temperature C., pressure 12 torr).

5 g. of distillate are obtained. The sump product its 108 g. The distillate has the following composi-
1.1% of hydrogen cyanide, 31.3% of acetic acid, % of methallyl cyanide and 18.1% of unchanged allyl acetate.

cordingly, 39.2 g. of acetic acid, corresponding to of the quantity used and to 81.5% of the quantity ed, and 53.0 g. of methallyl cyanide, corresponding % of the quantity used and to 81.5% of the quantity ed, are obtained from this test

EXAMPLE 9 mixture of 88 g. (0.5 mol) of cinnamyl acetate and (0.5 mol) of hydrogen cyanide is added dropwise a period of 2.5 hours to a catalyst solution comprising 50 g. of cuprous chloride, 27 g. of ammonium chloride, 42 ml. of water, 0.8 ml. of concentrated hydrochloric acid and a little copper powder heated to 80° C. in a nitrogen atmosphere. This is followed by a reaction lasting 5 hours.

After cooling, the organic layer in the reaction flask is repeatedly extracted with ethyl acetate, and the catalyst solution is subsequently concentrated by evaporation to dryness in vacuo by way of a cold trap.

The salts left in the flask are redissolved by the addition of 50 ml. of water, and the test is repeated as described above, using this catalyst solution.

The contents of the cold traps used in both tests are combined. The upper layer of ethyl acetate solution is separated off. The acetic acid content of the lower aqueous layer is determined by titration. The combined ethyl acetate solutions are concentrated by evaporation. Cinnamyl cyanide (B.P. 98–102° C./0.1 torr, M.P. 57–58° C.) is isolated from the residue by distillation.

An appreciable residue is left behind after distillation. The following yields were obtained from this double test:

44.1 g. of acetic acid=74% of the theoretical and 75.4 g. of cinnamyl cyanide=52.5% of the theoretical, based on the esters used.

EXAMPLE 10

A mixture of 88 g. (0.5 mol) of 1,4-butene-2-diol diacetate and 27 g. (1.0 mol) of hydrogen cyanide is added dropwise over a period of 3.5 hours at 80° C. to a liquid catalyst prepared by fusing together in a nitrogen atmosphere 20 g. of trimethylamine hydrochloride, 20 g. of dimethylamine hydrochloride, 20 g. of ethanolamine hydrochloride and 50 g. of cuprous chloride. After another 2.5 hours, the contents of the flask are repeatedly extracted with ethyl acetate at 30 to 40° C. The solvent is then concentrated by evaporation. The residue is dissolved in hot benzene. The benzene solution is filtered, following the addition of approximately 1 g. of active carbon, and finally is concentrated by evaporation. The residue is distilled. After some first runnings, 48.3 g. of a liquid which solidifies on cooling distill over at 80–100° C./0.05 torr. The crystals formed are filtered off from an oily impurity under suction, and are almost pure 1,4-dicyano-2-butene. The crystals weight 34.3 g. or 65% of the theoretical, based on the esters used. The oily products (14.0 g.) are a mixture of unchanged starting ester with 1,4-dicyano-2-butene. The acetic acid formed was not isolated in this test.

EXAMPLE 11

(a) Preparation of the catalyst 220 g. of cuprous chloride are dissolved in 1200 ml. of a saturated sodium chloride solution weakly acidified with hydrochloric acid. A mixture of 134 g. of allyl cyanide and 50 g. of methanol is added to this solution. The colourless complex is immediately formed with evolution of some heat, being suction-filtered and dried. The yield comprises 240 g. or 74% of the theoretical, M.P. (decomposition) upwards of 110° C.

Analysis. — $CH_2=CH-CH_2CN \cdot 2CuCl \cdot C_4H_5ClCuN$ (265.14). Calculated (percent): Cl, 26.75; Cu, 47.9; N, 5.28. Found (percent): Cl, 26.7; Cu, 47.9; N, 5.4.

(b) Reaction 50 g. of the catalyst described above are introduced into a three-necked flask equipped with the thermometer, reflux condenser, and dropping funnel. A mixture of 100 g. of allyl acetate and 27 g. of hydrogen cyanide is added dropwise from the dropping funnel in such a way that only small quantities flow back in the reflux condenser. The entire mixture of reaction products has been added after 4 hours. The flask is then heated for 3 hours at 80° C. After cooling, the contents of the flask are distilled into a trap by applying a vacuum. The contents of the trap are heated to 100° C. in order to distill off any remaining hydrogen cyanide. The individual constituents of the residue left are determined by gas chromatography. The catalyst left behind in the reaction flask is used in another run.

The results of several tests carried out in succession using the same catalyst are set out in Table I.

C. to a melt consisting of 20 g. batches of each of hydrochlorides of dimethylamine, trimethylamine and propylamine, and 50 g. of cuprous chlorides. The fl is then heated at the same temperature over a period 4 hours. The contents of the flask are extracted three tin with 200 ml. of benzene at 60 to 80° C., and the benze solution is separated from the contact melt by decan tion. The benzene solutions are combined and the solv is distilled off. The residue is distilled. 101.6 g. of a liqt are obtained from which 29.1 g. of 3-methylene gluta acid dinitrile melting at 51–52° C. crystallise out on co ing. The mother liquor left after the crystalline com nents have been filtered off under suction comprises 4.3 of 1,3-diacetoxy-2-methylene propane, 53% of 2-[aceto: methyl]-3-cyano-1-propene and 29% of 3-methylene g taric acid dinitrile (determined by gas chromatograph)

Accordingly, the yield of both nitriles comprises 74 of the theoretical. The catalyst recovered is fully acti and may therefore be used for further runs.

TABLE I

| | Distillate in trap, grams | Residue R, grams | Allyl acetate recovered | | Percent of quantity initially used | Allyl cyanide | | Yield, percent of the theoretical | Acetic acid, | | Percent of theoretical |
| | | | Percent of R | Grams | | Percent of R | Grams | | percent of R | Grams | |
|---|---|---|---|---|---|---|---|---|---|---|---|
| Mixture: | | | | | | | | | | | |
| 1 | 109.8 | 109.6 | 2.8 | 3.0 | 3.0 | 47.2 | 51.5 | 77 | 46.5 | 51.0 | 85 |
| 2 | 123.2 | 122.8 | 2.0 | 2.5 | 2.5 | 51.3 | 63.2 | 94.5 | 48.2 | 59.0 | 98 |
| 3 | 128.3 | 128.0 | 3.5 | 4.4 | 4.4 | 54.6 | 70.0 | [1]103 | 51.1 | 67.0 | [1]111 |
| 4 | 135.7 | 135.2 | 3.3 | 4.4 | 4.4 | 55.9 | 75.2 | [1]112 | 49.0 | 66.2 | [1]110 |
| Total | | | | 14.3 | | | 259.9 | 99 | | 243.2 | [2]101 |

[1] From what was adhering to the catalyst.
[2] Due to the method of analysis.

EXAMPLE 12

A mixture comprising 92 g. of the aforementioned diacetoxy compound and 54 g. of hydrogen cyanide is added dropwise over a period of 6 hours at 110° C. to a suspension of 50 g. of the complex salt described in Example 11 corresponding to the formula $$[CH_2=CH-CH_2.CN.2CuCl]$$

in 80 g. of 1,3-diacetoxy-2-methylene propane. The reaction mixture is then heated to the same temperature over a period of 2 hours. After cooling, the contents of the flask are poured into 750 ml. of benzene, and the benzene solution is decanted off from the highly viscous catalyst; the catalyst is heated while stirring at 70° C. with a further 200 ml. of benzene, and the second benzene solution is decanted off and combined with the first. The residue left after the benzene has been distilled off is distilled, giving 105.5 g. (76% of the theoretical) of a colourless liquid of B.P. 60–88° C./0.08 torr, $n_D^{20}$ 1.4457, most of which consists of the hitherto unknown compound 2-(acetoxymethyl)-3-cyano-1-propene. The catalyst recovered is not sufficiently active to be used for other tests. The reaction product purified by repeated distillation has the following features:

Infra-red spectrum:
  2250 cm.$^{-1}$(s) non-conjugated nitrile group
  1740 cm.$^{-1}$(sst) carbonyl double bond
  1660 cm.$^{-1}$(s) C=C double bond
  930 cm.$^{-1}$(m) 2 protons on the C=C double bond MPR 2.05 p.p.m. (3) methyl group, 3.15 p.p.m. (2) methylene group in addition to the nitrile group, 4.55 p.p.m. (2) methylene group in addition to the esterified oxygen, 5.4 p.p.m. (2) 2 protons on the C=C double bond.

Analysis—$C_7H_9NO_2$ (139.1). Calc. N=10.07%. Found N=10.0%.

Comparison test.—A mixture of 172 g. of 1,3-diacetoxy-2-methylene propane and 54 g. of hydrogen cyanide is added dropwise over a period of 8.5 hours at 110–115°

EXAMPLE 13

A mixture of 86 g. of 1,4-diacetoxy-2-butene and 27 of hydrogen cyanide is added dropwise over a period 3 hours at 80° C. to 50 g. of the complex salt of ben; nitrile with cuprous chloride corresponding to the form

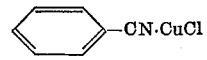

prepared in accordance with Ch. Rabaut, Bull. Soc. Chir France 3, 19, 785 (1898). The mixture is then heated i another 2 hours at 80° C. The reaction product is dilut with ethyl acetate and filtered off from a salt under st tion. The ethyl acetate solution is concentrated by eva oration and the residue is distilled. 46.7 g. of a colourl( liquid, some of which crystallises out on cooling, dis over between 100 and 148° C./12 mm. (M.P. 76° from ethanol). The liquid is 1,4-dicyano-2-butene.

EXAMPLE 14

(a) Preparation of the catalyst 1000 g. of pumice stone (grain size around 10 mn which have been treated beforehand with dilute hyd) chloric acid at boiling temperature and then dried, a mixed thoroughly with a melt of 100 g. of trimethylami hydrochloride and 100 g. of cuprous chloride.

(b) Reaction 800 g. of the catalyst described above are introduc into a double-jacket glass tube 5 cm. in diameter and cm. long. Attached to this reaction tube there is a drc ping funnel containing a mixture of the starting materia The lower end of the reaction tube opens into a Liel condenser to whose lower end a receiver is attached. T reaction tube is heated to 130–135° C. by allowing a he; ing liquid to flow into the jacket. A mixture of 1 mol allyl acetate and 1 mol of hydrogen cyanide is then add dropwise from the dropping funnel at a rate of 0.7 g. p minute. The reaction product condenses in the Liel condenser. It is collected in the receiver and removed lar intervals. The condensate comprises (averages over ral hours):

of unreacted hydrogen cyanide
of unchanged allyl acetate
of allyl cyanide, and
of acetic acid (determined by gas chromatography)

he yield of allyl cyanide comprises 86% of the theo-:al for a conversion of 19%.

EXAMPLE 15

(a) Preparation of the catalyst

)0 g. of cuprous chloride are dissolved in 500 g. of cyanide. 1000 g. of crude pumice stone (grain size ind 10 mm.) treated with dilute hydrochloric acid and dried, are added to this solution. The excess of allyl lide is distilled off from this mixture.

(b) Reaction

)0 g. of this catalyst are introduced into the reaction described in Example 14. A mixture of 1 mol of acetate and 1 mol of hydrogen cyanide is added drop- at a temperature of 135° C. at a rate of 0.35 g. minute. The reaction product is removed at regular ·vals and weighed. The unreacted hydrogen cyanide istilled off through a small distillation column. The position is determined from the residue by gas chro- ography (average over several hours):

of unchanged allyl acetate
of allyl cyanide
of acetic acid

)% of the quantity of hydrogen cyanide originally are recovered.

or a conversion of 61%, the yield of allyl cyanide is and the yield of acetic acid is 88% of the theoretical.

EXAMPLE 16

(a) Preparation of the catalyst

)0 g. of the complex salt $$CH_2=CH-CH_2-CN \cdot 2CuCl$$

mixed with 200 g. of Fullers earth and the mixture is pressed into tablet form.

(b) Reaction reaction tube 4.5 cm. in diameter and 90 cm. long is l in layers with quartz chips and with the tablets. A ure of 1 mol of allyl acetate and 1 mol of hydrogen lide is passed through the tube at a rate of 0.85 g. per ite. The reaction product has the following composi- (averages over several hours):

of hydrogen cyanide
of unchanged allyl acetate
of allyl cyanide
of acetic acid or a conversion of 90%, the yield of allyl cyanide is % and the yield of acetic acid is 98.5% of the theo- al.

EXAMPLE 17

(a) Preparation of catalyst solution of 265 g. of the complex salt $$[CH_2=CH-CH_2-CN \cdot 2CuCl]$$

ssolved under heat in 900 ml. of allyl cyanide. 420 g. itre) of porous $SiO_2$ spheres are introduced into this tion and the flask is evacuated in order to remove en- ped air. After cooling, the liquid phase is separated. spheres left, impregnated with the complex, are in- y dried at 30° C. (784 g.) and then introduced into :eaction tube. A gentle stream of nitrogen at 100° C. ssed through the catalyst for a period of 8 hours. The ss of allyl cyanide evaporates and is collected in the receiver. The quantity of distillate comprises 236 g., so that the 1 litre of $SiO_2$ spheres contain 128 g. of the complex salt. This figure is confirmed by copper analysis of the catalyst (found: Cu 11.4%).

The porous $SiO_2$ spheres used are prepared by stirring a calcium-oxide-containing silica filler and a ceramic binder (for example kaolin or bentonite) into a stable silica sol and allowing the suspension thus obtained to flow together with a gelating agent into an organic medium in which the suspension is dispersed in the form of spheres, solidifying into solid beads as it sinks in the organic medium. The beads are separated, dried, calcined, extracted with an aqueous mineral acid, and then dried again.

(b) Reaction

As described in Example 16, a mixture of 1 mol of allyl acetate with 1 mol of hydrogen cyanide is passed at 135° C. and a rate of 0.85 g. per minute through the catalyst described in (a). For a conversion of 94%, allyl cyanide is obtained in a yield of 94.5% and acetic acid in a yield of 98% of the theoretical.

EXAMPLE 18

(a) Preparation of the catalyst 1 litre (400 g.) of porous $SiO_2$ spheres 3–6 mm. in diameter (prepared as in Example 17(a)) are introduced into a solution of 100 g. of cuprous chloride in 600 ml. of concentrated hydrochloric acid. The hydrochloric acid is evaporated in vacuo. The catalyst thus prepared is introduced into the reaction tube and freed from traces of hydrochloric acid by passing nitrogen through the reaction tube at 180° C.

(b) Reaction

As described in Example 16, a mixture of 1 mol of allyl acetate and 1 mol of hydrocyanic acid is passed through this catalyst at 140° C. and at a rate of 0.85 g. per minute. For a conversion of 87%, the yield of allyl cyanide is 94.5% and the yield of acetic acid is 93% of the theoretical.

EXAMPLE 19

(a) Preparation of the catalyst

A solution of 3 mols of $CuCl_2 \cdot 2H_2O$ in 1 litre of water is poured over 1 litre of $SiO_2$ spheres (prepared as in Example 17(a)) in a column. After the spheres have been saturated, the aqueous solution is run off and the spheres which are still moist are treated with gaseous $SO_2$ to reduce the cupric salt to cuprous chloride. The spheres are washed in counter current with 6 litres of water and then dried by the introduction of nitrogen at a temperature of 160° C.

(b) Reaction

As in the preceding example, a mixture of 1 mol of allyl acetate and 1 mol of hydrogen cyanide is passed through this catalyst at 135° C. and at a rate of 0.85 g. per minute.

Allyl cyanide is obtained in a yield of 91.5% and acetic acid in a yield of 90.5% for a conversion of 87%.

EXAMPLE 20

(a) Preparation of the catalyst

As described in Example 18.

(b) Reaction

A mixture of 1 mol of predominantly cis-1,4-diacetoxy-2-butene (butene-1,4-diol diacetate) and 3 mols of hydrogen cyanide is passed through this catalyst accommodated in the apparatus described above at a rate of 1.69 g. of per minute at a temperature of 150° C. under a pressure of 18 torr. First the hydrogen cyanide, and then the acetic acid which is formed, followed by the unchanged starting ester, are separated by distilling the crude product. 1-cyano-4-acetoy-2-butene and 1,4-dicyano-2-butene are separated from the mixture obtained by fractionating the residue.

18.5% of 1-cyano-4-acetoxy-2-butene and 29.5% of 1,4-dicyano-2-butene are obtained for a conversion of 37%.

EXAMPLE 21

The tests A, B and C are carried out under comparable conditions.

For each of these tests, the quantity and composition of the catalyst are the same as described in Example 10.

The same catalyst is used in all the tests of series C, i.e. test C2 is carried out with the catalyst used in test C1 and so on.

The following materials are used:
Test A: 88 g. (0.5 mol) of 3,4-diacetoxy-1-butene and 27 g. (1.0 mol) of hydrogen cyanide
Test B: A mixture of 28 g. of 3,4-diactoxy-1-butene with 60 g. of 1,4-diacetoxy-2-butene and 27 g. of hydrogen cyanide
Test C: 88 g. of 1,4-diacetoxy-2-butene and 27 g. of hydrogen cyanide The mixture of diacetate and hydrogen cyanide is added dropwise to the liquid catalyst at 80° C. over a period of 3 hours. This is followed by a reaction lasting 3 hours. The reaction mixture is left standing overnight and on the following day is heated to between 70 and 80° C. By applying a vacuum to the flask, the acetic acid formed (in addition to a little unchanged hydrogen cyanide) is distilled into a cold trap. The composition of the contents of the trap is determined by gas chromatography.

The residue left following distillation of the acetic acid is extracted 5 times with 100 ml. of benzene at 80° C. The combined benzene extracts are filtered and concentrated by evaporation. The residue is distilled. The distillate solidifies on cooling and is substantially pure 1,4-dicyano-2-butene. The results of the tests are set out in the following table:

|  | Tests | | | | |
| --- | --- | --- | --- | --- | --- |
|  | A | B | C1 | C2 | C3 |
| Weight of the contents of the trap, grams | 54.2 | 50.5 | 59.0 | 58.0 | 58.5 |
| Acetic acid content, percent | 90.3 | 90.4 | 91.8 | 85.1 | 81.6 |
| Acetic acid yield (percent of the theoretical) | 81 | 76 | 87 | 87 | 78 |
| Weight of the distillate B.P. 100-120° C./0.1 torr, grams | 30.3 | 32.3 | 32.0 | 48.0 | 48.2 |
| Solidification point of the distillate, degrees | 63 | 66 | 68 | 58 | 56 |
| Yield (percent of the theoretical) of 1,4-dicyano-2-butene | 56 | 60 | 59 | 89 | 90 |

What we claim is:
1. A process for the preparation of 3,4-ethylenically unsaturated nitriles which comprises reacting:
(A) an ester of the formula

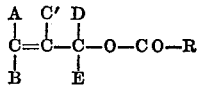

wherein one of the radicals A, B, C′, D and E, which may be the same or different, is selected from the group consisting of hydrogen, lower alkyl, phenyl, cyclohexyl, phenyl or cyclohexyl substituted by lower alkyl, and —CH₂—O—CO—R; and the others of the radicals A, B, C′ and D are hydrogen or lower alkyl; R is hydrogen or lower alkyl; with
(B) HCN in which the mole ratio of ester to HCN ranges from stoichiometric to a threefold excess of the ester;
in the presence of a catalyst consisting essentially of cuprous halide in which the cuprous halide comprises at least 0.1% by weight of the ester (A) at a temperature in the range from about 20 to about 200° C. and at a pressure up to the partial pressure of the HCN.

2. The process of claim 1 wherein said ester has formula

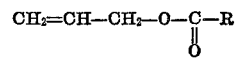

in which R is hydrogen or alkyl of 1 to 4 carbon atom

3. The process of claim 1 wherein said ester has formula

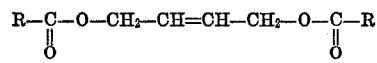

in which R is hydrogen or alkyl of 1 to 4 carbon atom

4. The process of claim 1 wherein said ester has formula

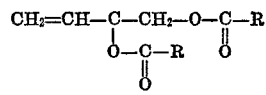

in which R is hydrogen or alkyl of 1 to 4 carbon atom

5. The process of claim 1 wherein said ester is a mixture of the diol esters of the formulae

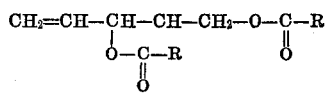

and

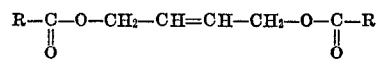

in which R is hydrogen or alkyl of 1 to 4 carbon atom

6. The process of claim 1 wherein said ester has formula

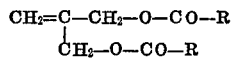

in which R is hydrogen or alkyl of 1 to 4 carbon atom

7. The process of claim 1 wherein said catalyst is complex of the formula $$CH_2{=}CH{-}CH_2{-}CN.2CuCl$$

8. The process of claim 1 wherein said catalyst is complex of the formula

9. The process of claim 1 wherein said catalyst is complex of the formula

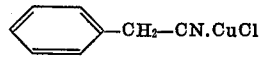

10. The process of claim 1 wherein said reacting carried out in the gas phase and the cuprous halide catalyst is on a supporting material.

11. The process of claim 1 wherein said reacting is carried out at a temperature of from 120 to 200° C.

12. The process of claim 10 wherein said supporting material is selected from the group consisting of pumice, porous clay and highly porous silica.

13. The process of claim 1 in which said reacting carried out under anhydrous conditions.

14. The process of claim 1 wherein said catalyst is crystallized complex of cuprous chloride and a nitrile.

References Cited

UNITED STATES PATENTS 3,558,688  1/1971  Drinkard, Jr. _____ 260—465
3,461,149  8/1969  Hardy et al. _____ 260—453 A JOSEPH P. BRUST, Primary Examiner U.S. Cl. X.R.

260—438.1, 464, 465 H, 465 K, 540, 541, 542